United States Patent [19]

Martinez

[11] 4,208,630
[45] Jun. 17, 1980

[54] NARROW BAND PAGING OR CONTROL RADIO SYSTEM

[75] Inventor: Louis Martinez, Carson, Calif.

[73] Assignee: Altran Electronics, Inc., Harbor City, Calif.

[21] Appl. No.: 952,815

[22] Filed: Oct. 19, 1978

[51] Int. Cl.² .......................... H04B 1/40; H04B 1/00; H04B 7/00; H04B 1/16

[52] U.S. Cl. ........................................ 375/7; 340/311; 375/37; 375/107; 455/31; 455/75

[58] Field of Search ...................... 325/31, 51, 53–55, 325/58, 64, 346, 349, 419–421, 423, 1, 3, 4, 5, 9, 10, 11, 20; 340/147 SY, 183, 408, 413, 224, 311; 179/15 BP, 15 AL; 343/6.5 SS, 176, 179, 200; 331/1 A, 17, 25, 2

[56] References Cited
U.S. PATENT DOCUMENTS 4,117,405 9/1978 Martinez ............................... 325/3 X

*Primary Examiner*—John C. Martin
*Assistant Examiner*—Aristotelis M. Psitos
*Attorney, Agent, or Firm*—Blakely, Sokoloff, Taylor & Zafman

[57] ABSTRACT

The inventor discloses an ultra narrow band relatively ultra stable radio apparatus for communicting paging or control signals from a central transmitter to a multiplicity of remotely located receivers, which receivers may be carried on the person of individuals or may be fixed to other devices which they control, such as city traffic control lights, programmable signs, machines, or the like, wherein the central transmitting device and the remote receiving device are both phase locked to a local broadcast station RF carrier so as to provide a means to precisely synchronize the transmitting device with the receiving device and thereby achieve very high signal-to-noise ratio transmissions. The apparatus is capable of transmitting a digital identification code or a digital message and the receiving devices may output a simple on-off signal indicating the presence of a call, or digital message may be output to control an apparatus attached to said receiver. An alternative bidirectional remote device that can both receive and transmit is also disclosed. A novel frequency synthesizer, and means for real time synchronization of both the transmitter and the receiver, are also disclosed.

13 Claims, 4 Drawing Figures

NARROW BAND PAGING OR CONTROL RADIO SYSTEM

FIELD OF THE INVENTION

This invention relates to an ultra narrow band relatively ultra stable radio apparatus for communicating paging or control signals from a central transmitter to a multiplicity of remotely located receivers, which receivers may be carried on the person of individuals or which may be fixed to other devices which they control, such as city traffic control lights, programmable signs, machines, or the like. Alternatively, a disclosed bidirectional remote device provides two-way communication for these applications.

This invention is related in part to my patent application filed with the U.S. Patent Office on Nov. 2, 1976 titled, "Narrow Band Communication System," now U.S. Pat. No. 4,117,405, and is substantially identical to my invention disclosed and filed in the U.S. Patent and Trademark Office Disclosure Document Program File Number 053806 on Nov. 10, 1976; which document is referred to herein and made a part of this file jacket by reference.

DESCRIPTION OF PRIOR ART

The transmission of paging signals to alert individuals in the field or to actuate or control a remote apparatus comprises a segment of the communication art wherein brief messages must be communicated with high reliability. Paging systems in the prior art usually rely on subcarrier audio tones for coding purposes, and to achieve improved signal-to-noise ratios. These subcarrier tones modulate a radio frequency carrier and this results in relatively wideband radio signal transmission. For example, a multiplicity of subcarrier tones spaced over a few hundred cycles in separation are often used by prior art paging devices to provide user code identification means, i.e., different paging receivers will respond to different combinations of these subcarrier tones. This ensemble of various combinations of subcarrier tones may encompass a radio frequency bandwidth 500 to 1000 cycles or more. Such a wide radio bandwidth may admit a substantial amount of interference from either intentional or unintentional signals from nearby channels, and these interfering signals significantly reduce the signal-to-noise ratio, when compared to the signal-to-noise ratio attainable in the instant invention. In my invention the radio bandwidth is constrained to approximately 100 Hz or less, and in addition, the digital data clock pulses are also synthronized in the transmitter and the receiver, and this provides a substantial improvement in system reliability.

An alternative illustrative application of the present invention is in the control of vehicle traffic control lights. In the prior art most city traffic control lights are synchronized every few weeks by manually resetting electrical clocks included therein. This is both time consuming and expensive and, in addition, there is no practical means of easily altering the traffic control light sequence, as for example, during rush-hour traffic. In cities where traffic control lights are remotely controlled, use of telephone lines is usually employed and these are expensive. Similarly, traffic control signs which are electrically alterable are sometimes used to direct traffic or pass traffic control information to drivers. These are usually controlled through relatively expensive telephone circuits.

Remote monitoring and control of city traffic lights, unattended vending machines, and remote data gathering apparatus such as used in the environmental measurements field are illustrative of applications in the prior art which have employed conventional wire-line or radio communication apparatus and which can be more economically and reliably serviced using my invention.

SUMMARY OF THE INVENTION

In my patent application filed with the U.S. Patent Office on Nov. 2, 1976, now U.S. Pat. No. 4,117,405, I disclosed an ultra-narrow band communication system wherein a transmitting device and a receiving device were phase-locked to a local broadcast station RF carrier signal so as to provide a means to precisely synchronize the transmitting device with the receiving device and thereby achieve very high signal-to-noise ratio transmissions. The present invention disclosed herein employs a similar synchronizing mechanism (i.e., using a broadcast station for reference), however, in this invention a central transmitting apparatus is disclosed which transmits signals to a multiplicity of remotely located receivers, which receivers may be used for paging purposes, or for controlling an apparatus connected thereto.

The apparatus disclosed herein is capable of transmitting either a digital identification code or a digital message so that the receiving device may output a simple on-off signal indicating the presence of a call, or a digital message may be output. For example, the digital message output may go to a single seven segment light emitting diode display which displays a telephone number which the receiver owner may call for additional information after he is paged.

The disclosed apparatus employs a local radio broadcast station as a relative radio frequency reference to precisely establish the frequency of a central transmitter and to precisely establish the receiving frequency of a multiplicity of remotely located paging and control receivers. Each independent paging and control receiver detects signals from the local broadcast station. These receivers incorporate a frequency synthesizer which is phase-locked to this broadcast station signal to synthesize a local oscillator frequency which is used to synchronously detect paging and control signals sent from the centrally located transmitter. Similarly, the centrally located transmitter detects signals from the broadcast station and employs a frequency synthesizer locked to these broadcast signals to generate one of a multiplicity of paging and control radio frequencies corresponding to the frequencies of the receivers. Thus the transmitters and receivers are precisely phase-locked to the same reference (the broadcast station) and this permits a very narrow bandwidth transmission to substantially improve the link signal-to-noise ratio. Transmitted and received signals are ultra stable relative to each other. The paging and control frequency may be selected from a multiplicity of closely spaced subchannels, which subchannels may be only about 100 Hz wide. Therefore, upwards of 100 or more separate paging and control subchannels may be established on one conventional radio voice channel of 10 KHz bandwidth. Many paging and control receivers may also operate on the same subchannel by providing suitable coding and time synchronization, using, for example, a coding method hereinafter described.

The central transmitter employs the same radio broadcast station used by the paging and control receivers to phase-lock to one of a multiplicity of frequencies. Paging and control receivers synchronously detect the central radio transmissions. Either on-off type paging signals may be communicated using this apparatus or a digital message comprising serially coded digital bits may be transmitted or other signal formats may be used. The central paging and control transmitter need not monitor its assigned radio channel prior to signal transmission because the very narrow transmission bandwidth used in my invention results in a sufficiently intense concentration of energy in a small spectrum space so that it can burn through or override most other signal transmissions that may also occupy the channel. The paging and control transmission will not unduly interfere with other signal sources which it overrides. The paging and control signal may also be transmitted in the so called "guard band" of frequencies between the assigned channels of, for example, voice transmitters to further reduce the possibility of mutual interference.

Other features and advantages of this ultra narrow band paging and control apparatus are comparable or equivalent to those advantages and features recited in my aforesaid patent application filed Nov. 2, 1976, now U.S. Pat. No. 4,117,405.

In this disclosure I also describe a new frequency synthesizer which has certain advantages over the frequency synthesizer which I described in my patent application of Nov. 2, 1976. My patent application filed Nov. 2, 1976 disclosed an alarm and status signal apparatus comprising a multiplicity of ultra narrow band transmitters which communicated with a centrally located receiver and which included a frequency synthesizer uniquely adapted for these purposes and a polling means by which the central broadcast station can poll individual alarm transmitters to determine their status. The present invention discloses a mirror image reversal of the aforesaid invention wherein a centrally located multi-channel transmitter communicates signals through ultra narrow bandwidth channels to a multiplicity of remotely located receivers so as to alert the user of said receivers to the presence of a paging message or to control associated apparatus to which said receiver may be attached. The present invention also discloses a second novel synthesizer feature: it not only synthesizes a precise local frequency, but also includes a precise digital clock generator which is synchronized periodically to time "beeps" transmitted by the commercial broadcast station. These time beeps may be one second in duration and transmitted once hourly, for example. The disclosed digital clock generator is continually driven by the precision crystal controlled oscillator contained within the frequency synthesizer, and includes means to reset the digital clock in accordance with the hourly time beeps transmitted by the broadcast station, and further includes a predicted time window gate signal derived from the digital clock, which time window gate predicts the approximate time at which the hourly beep is expected, and consequently minimizes the possibility that the digital clock will synchronize on a false time beep, such as might be generated by musical instruments at frequencies approximating those developed by the beep generator.

A disclosure is made herein for a paging and control receiver-transmitter, herein called a "transceiver", which incorporates some features of the aforesaid patent application filed Nov. 2, 1976, and the receiver disclosed in the present invention. This transceiver can transmit to a centrally located receiver-transmitter using ultra narrow bandwidth channels and can receive signals from the centrally located receiver-transmitter and thereby comprises a two-way paging and control apparatus.

A disclosure is also presented herein for modifications necessary to a broadcast station to permit it to transmit periodic time beeps which are to be detected by the multiplicity of paging and control receivers and the centrally located paging and control transmitter for time synchronization purposes.

DESCRIPTION OF THE PREFERRED EMBODIMENT

Figure 1:
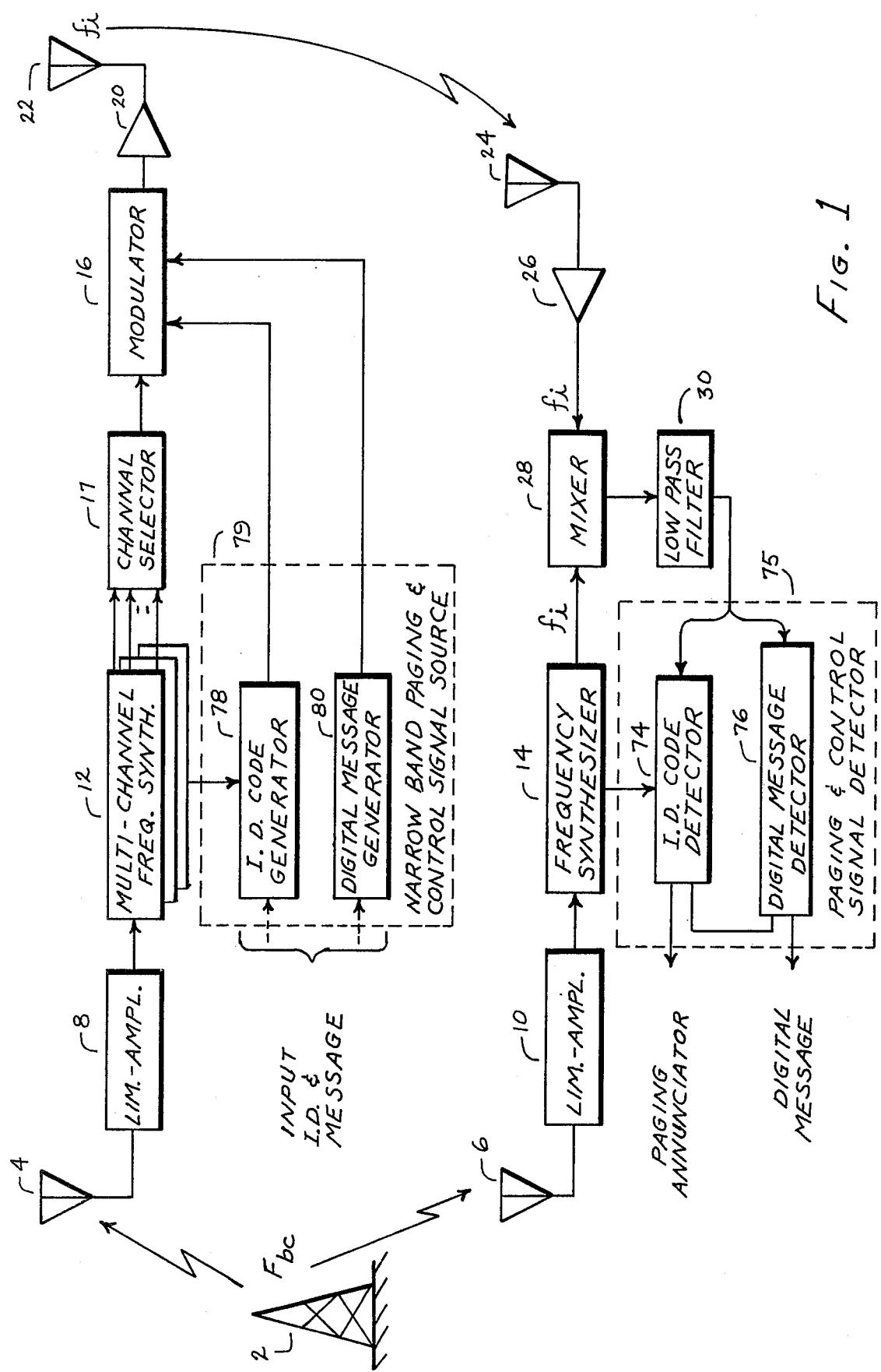
FIG. 1 is an overall simplified block diagram of the ultra narrow band paging and control radio system.

FIG. 1 graphically portrays broadcast station 2 which may be, for example, a conventional commercial AM broadcast station operating on a clear channel, a television station, or a transmitter especially constructed for paging and control purpose. Receiving antennas 4 and 6 detect the signal from broadcast station 2. This signal is amplified and limited by two amplifiers 8 and 10 so as to remove most of the amplitude modulation on the broadcast station signal. Limiter amplifiers 8 and 10 are designed to provide symmetrical amplitude limiting in both the positive and negative excursions of the broadcast signal and to provide a symmetrical band pass characteristic so as to minimize undesirable amplitude modulation (AM) to phase modulation (PM) translation which can occur in unsymmetrical channels. This AM to PM translation appears as phase jitter in the output of limiter amplifiers 8 and 10 and can cause instability in frequency synthesizers 12 and 14. Frequency synthesizers 12 and 14 phase-lock to the output signal from limiter amplifiers 8 and 10 and synthesize a frequency $f_i$, which is usually higher than the frequency of the broadcast station.

In the central transmitter (FIG. 1) the frequency synthesizer 12 may comprise a multi-channel frequency synthesizer which generates a multiplicity of frequencies corresponding to the frequencies used by the multiplicity of remote paging and control receivers. Modulator 16 in the transmitter accepts the output of frequency synthesizer 12 and the output of narrow-band paging and control signal source 79 comprising identification (I.D.) code generator 78 and digital message generator 80 and provides a modulated output carrier signal. The modulated carrier is amplified by 20 and the resulting output of 20 is radiated by antenna 22.

The front end of the transmitter at the central station which determines its operating radio frequency, including elements 4, 8, and 12, is almost identical to the front end of the paging and control receivers. Antenna 4 receives signals from broadcast station 2 and these signals are amplified and limited by amplifier 8 and fed to frequency synthesizer 12 which synthesizes a frequency $f_i$ identical to the carrier frequency which is to be received by antenna 24 in the paging and control receiver with which it will communicate. Channel selector 17 selects the specific channel for receiver to be paged. In the process of paging a specific receiver, channel selector 17 is set to the desired channel and the I.D. code generator 78 is preset to the identification code of the desired receiver and any digital message which is to be communicated to the designated receiver is inserted into the digital message generator 80. Modulator 16 accepts the output of channel selector 17, I.D. code generator 78, and digital message generator 80 and transmits this ensemble to the designated receiver. The receiver detects this signal on antenna 24 and amplifies it in amplifier 26 which raises the level of the incoming signal to that level necessary to operate synchronous mixer 28. Antenna 6 detects the broadcast signal from 2 and amplifies it in the limiter-amplifier 10 and sends it to frequency synthesizer 14 which outputs frequency $f_i$ identical to the frequency being transmitted by the central transmitter. Synchronous mixer 28 operates in a manner analogous to so called zero-IF receivers wherein the local oscillator signal from frequency synthesizer 14 is at the same frequency as the carrier of the incoming signal detected by antenna 24 so that the mixture of these two signals results in a zero intermediate frequency, except for the thus detected paging and control signals which continue through low pass filter 30 then to paging and control signal detector 75 which comprises an I.D. code detector 74 and a digital message detector 76. I.D. code detector 74 includes a preset stored identification code corresponding to the specific receiver identification. When incoming code signals match the stored identification code, a paging annunciator signal is transmitted to the user of this receiver. An enable pulse is also generated by 74 and sent to the digital message detector 76. If a digital message is being transmitted to this receiver, then the enabling pulse from I.D. code detector 74 gates ON digital message detector 76 which then outputs the digital message.

In an alternative but comparable receiver design the incoming radio signals into the remote devices can be frequency down converted to an intermediate frequency (IF) prior to processing in the manner described above. In such cases the local oscillator (LO) signal for the down converter stage (i.e., first mixer) is itself generated by an additional frequency synthesizer 14 at a frequency offset from $f_i$ by the desired IF. Of course, the synthesizer 14 circuit could be constructed to simultaneously output both the offset LO signal frequency and the intermediate frequency signal for the synchronous detector 28 by using well known frequency divider chain methods.

Figure 2:
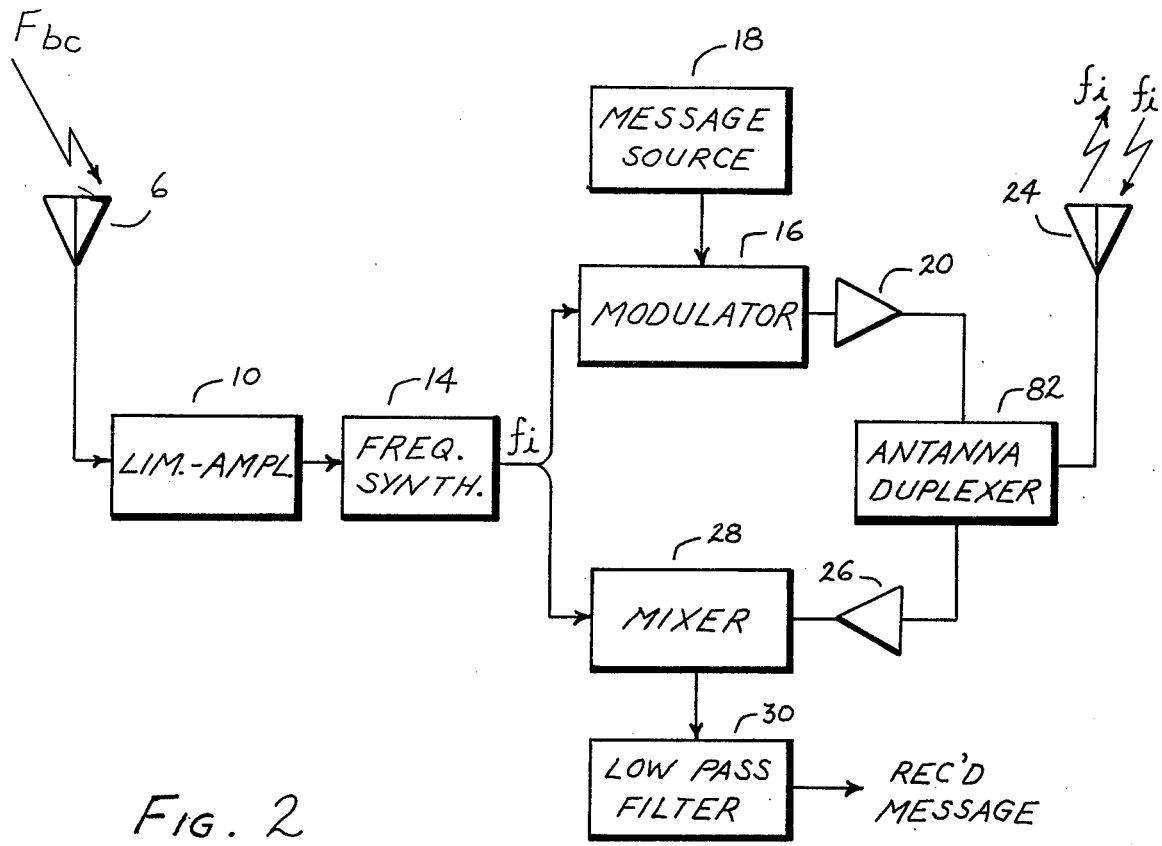
FIG. 2 illustrates a paging receiver-transmitter that both receives and transmits over an ultra narrow-band radio channel, herein called a "transceiver."

FIG. 2 illustrates a bi-directional paging and control radio transceiver which is capable of both receiving paging and control signals, and transmitting reply messages to a centrally located receiver-transmitter. This paging and control radio transceiver comprises a combination of the alarm and status signal transmitter device disclosed in my patent application filed Nov. 2, 1976, now U.S. Pat. No. 4,117,405, and the paging and control receiver disclosed herein. Therefore it shall be understood that when the paging and control radio transceiver illustrated in FIG. 2 is in the transmitting mode, the apparatus operates in a manner analogous to that described in my aforesaid U.S. Pat. No. 4,117,405.

Referring to FIG. 2, antenna 6 receives signals from broadcast station 2 at a frequency $F_{bc}$ and amplifies and limits these signals in 10 and sends them to frequency synthesizer 14 which generates an output frequency $f_i$ which is input to both modulator 16 and synchronous mixer 28. In the receiving mode, antenna 24 detects signals transmitted from the centrally located transmitter and routes these signals through antenna duplexer 82 to receiving amplifier 26. Mixer 28 receives signals from both amplifier 26 and frequency synthesizer 14 and synchronously detects messages transmitted from the centrally located transmitter, which signals are subsequently filtered in low pass filter 30 and output to the user of the paging and control radio transceiver or which are further connected to a machine or apparatus which is to be controlled through signals sent from said centrally located transmitter.

In the transmitting mode the remote paging and control radio transceiver of FIG. 2 accepts messages from message source 18 and modulates the carrier frequency $f_i$ generated by frequency synthesizer 14 in modulator 16 and connects this modulated output from 16 to amplifier 20 which subsequently sends the signal through antenna duplexer 82 to antenna 24 where it is radiated to the centrally located receiver. Thus the apparatus in FIG. 2 is capable of both receiving and transmitting digital messages through ultra narrow bandwidth channels.

Figure 3:
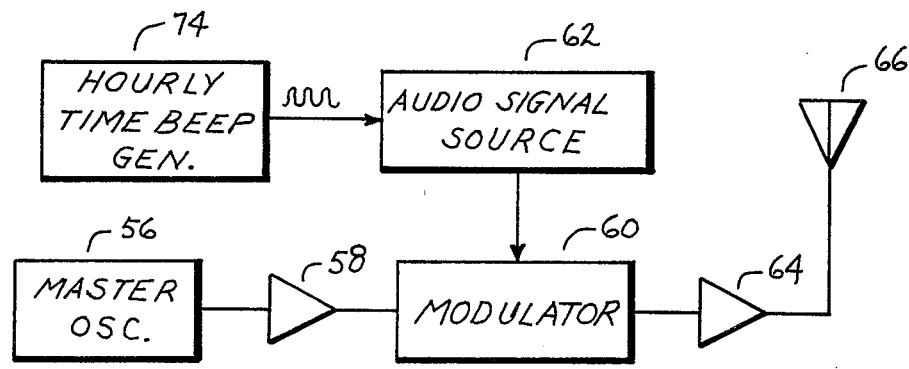
FIG. 3 is a block diagram of the modifications necessary to a broadcast station so that it may transmit hourly time beeps.

FIG. 3 illustrates the changes necessary to an AM broadcast station so that it may transmit periodic time synchronizing beeps, for example, on an hourly basis. Most conventional AM broadcast stations contain a master oscillator 56 which establishes the basic carrier frequency of the broadcast station and a buffer amplifier 58 which amplifies and isolates master oscillator 56. Modulator 60 accepts audio program material from audio signal source 62 and modulates the output of buffer amplifier 58. This modulated carrier signal is further amplified in 64 and radiated by antenna 66. In my invention an additional component 74 is added to the broadcast station to generate time beep signals which may occur, for example, once per hour and which may last for a duration of one second. Such hourly beep signal might consist of a one second tone at a frequency of 428 Hz transmitted every hour. Many commercial broadcast stations presently transmit hourly beep signals such as those described herein, however, the modifications shown in FIG. 3 may be included in those AM broadcast station which do not presently transmit such signals. These hourly time beep synchronization signals are detected and used at both the centrally located paging and control transmitter site and at the multiplicity of receivers so as to synchronize the digital data pulses and thereby precisely establish the time at which digital message bits will be transmitted and received.

Figure 4:
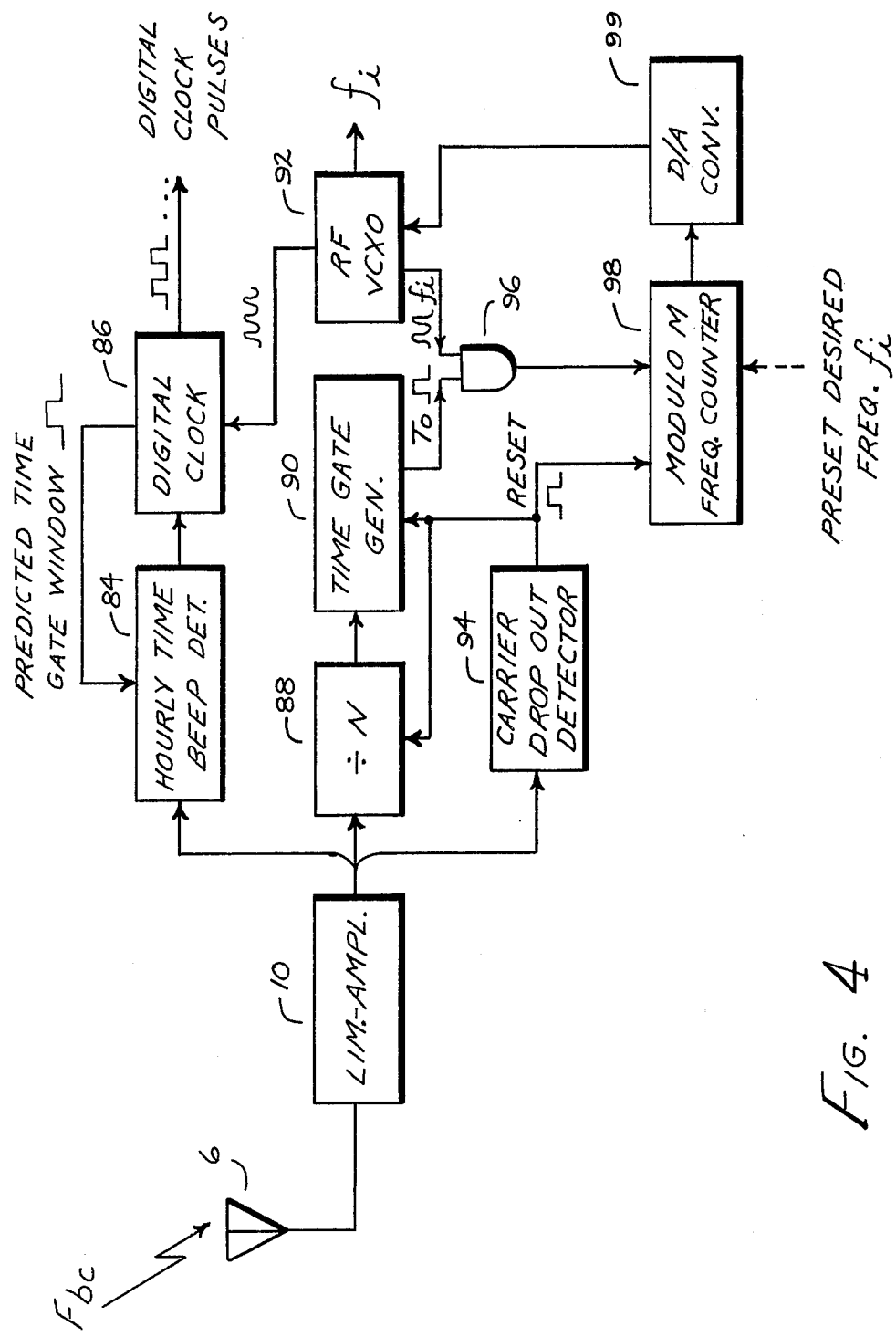
FIG. 4 is a block diagram of a radio and digital frequency synthesizer which may be used in either the paging and control receiver or the central paging and control transmitter, or for other applications where precise frequency and time signals are required at a plurality of remote locations.

The radio and digital frequency synthesizer illustrated in FIG. 4 provides digital clock pulses at a rate precisely synchronized with periodic time beeps transmitted by the commercial broadcast station, and provides a radio frequency synchronized with broadcast station RF carrier $F_{bc}$. A principal advantage of this frequency synthesizer is that it is not susceptable to the usually unavoidable zero-crossing jitter on the broadcast station RF carrier signal, which jitter may approach ±5 to ±10 nanoseconds RMS for AM broadcast stations. This jitter is caused by AM to PM translations on the broadcast signal as it passes through limiter-amplifier 10 and divider 88. This jitter is effectively averaged out in my circuit of FIG. 4.

Referring to FIG. 4, the incoming broadcast station signal is detected by antenna 6 which is then amplified and limited by 10 and then divided down in frequency by divider 88. Time gate generator 90 receives the output of frequency divider 88 from which it generates a precisely defined gating signal of time duration $T_o$, which duration may be on the order of one second. This $T_o$ time gate signal enables AND gate 96 so that signals from radio frequency voltage controlled cyrstal oscillator (VCXO) 92 will pass through AND gate 96 to modulo M frequency counter 98.

The minimum number of stages in the modulo M frequency counter 98 is established by the drift expected in VCXO 92 and the maximum length of modulo M counter 98 is established by the number of subchannels (i.e., band spread) over which the frequency synthesizer must operate. For example, if the synthesizer is to be tuneable over ten frequency subchannels which are spaced at intervals of 100 Hz apart, then the total count which may be accumulated on modulo M frequency counter 98 will be 1000, plus the drift in VCXO 92. In this case a modulo M frequency counter length of 10 binary bits would be sufficient since this would permit a count accumulation of 1024. Since the frequency of VCXO 92 will drift by an amount substantially less than 1000 Hz, then a 10 bit modulo M counter would suffice from this stand point also.

The operation of this frequency synthesizer using a 10 bit modulo M frequency counter may thus be described as follows. If we assume that the RF output frequency $f_i$ desired is 27,065,000 Hz, and if we assume time gate generator 90 develops a precise time gate of $T_o = 1$ second in duration, then during the time that gate 96 is open a total of 27,065,000 cycles will pass through the gate and these will be counted in counter 98, however, counter 98 being only 10 bits long will have replicated its count 26,430.664 times (i.e., this ratio results from the division of 27,065,000 by 1024). In other words counter 98 would have over-flowed its count 26,430 times and yield a remainder "K" of 0.664 times its full capacity. Consequently, after one second the counter will display the count K=679, rounded of to the nearest whole binary digit (i.e., this is 0.664×1042=679).

If the frequency of VCXO 92 was 100 cycles higher than the desired frequency then the remainder K residing in the counter, after the expiration of a $T_o = 1$ second time gate, would be 779. A VCXO frequency 100 cycles lower than the desired frequency would result in a remainder K=579 in counter 98. Consequently, if we present counter 98 to a count of 1024 less 679 (i.e., 345), then after gate 96 opens for precisely one second the counter will read 000, assuming the frequency of VCXO 92 was precisely 27,065,000 Hz. If the frequency was lower than desired, we would obtain a "negative" count K and if it were higher than desired this would result in a positive count K. Analog to digital (A/D) converter 99 is connected to the output of counter 98 and it converts the binary output count of counter 98 into an analog control voltage which controls the frequency $f_i$. Any frequency $f_i$ may be generated by presetting the count of counter 98 before each opening of gate 96.

Hourly time beep detector 84 detects time sync signals sent from the broadcast station and precisely synchronizes digital clock 86. Digital clock 86 is continuously driven from the output of VCXO 92 and develops an absolute time reference and also develops a precise time gate window at the predicted time of arrival of the hourly time beeps sent from the central broadcast station. The purpose of this predicted time gate window is to minimize the possibility that the hourly time beep detector will erroneously synchronize to extraneous tones occuring at random times, such as those tones developed by certain musical instruments.

Carrier drop-out detector 94 continually monitors the amplitude of the output signal from limiter amplifier 10 and detects carrier drop-outs, or signals too weak to properly drive frequency divide 88. Upon the occurrence of such carrier dropouts, a reset signal is generated to reset time gate generator 90, divider 88, and counter 98 and thus avoid the possibility of a miscount. One may expect at least two successful counts every three seconds without carrier drop-outs.

After every successful count during a gate period $T_o$, the closing of gate 96 enables A/D converter 99 in order to transfer the binary count remaining on counter 98 to A/D converter 99. A/D converter is in effect a digital "sample and hold" circuit which memorizes (i.e., latches) the frequency which VCXO 92 must maintain to remain precisely at the assigned frequency preset on counter 98.

A frequency selection table may be readily constructed to permit users of my invention to preset any desired output frequency $f_i$, given an input broadcast station frequency $F_{bc}$, and a fixed division integer N for divider 88. Using such a table, time gate $T_o$ may be any value of about 1 second, which value will change for different broadcast station frequencies $F_{bc}$, assuming a fixed divider 88 integer N. Integer N could be $2^{20}$, for example, if one uses AM broadcast stations which range in frequency from 550 to 1600 KHz. In this latter case $T_o$ would range from 1.9065 to 0.65536 seconds and a table taking this into account could be constructed to establish the number to preset counter 98 to yield a desired frequency $f_i$ for any broadcast frequency $F_{bc}$. This synthesizer is readily constructed using conventional large scale integrated circuit techniques and high speed digital counters and gates.

Obviously many modifications and variations of the present invention are possible in the light of the above teachings. It is therefore to be understood that within the scope of the teaching herein the invention may be practiced otherwise than is specifically described.

What is claimed is:

1. A narrow-band paging or control radio communication system comprising, in combination, a plurality of remote radio receivers, a central radio transmitter station, and an existing local radio broadcast station which transmits synchronizing reference signals to the central transmitting station and to the remote radio receivers; said receivers each comprising:

(A) first receiving antenna means for detecting the radio frequency carrier of the broadcast station, (B) first tuned amplifier-limiter means connected to the output of the first receiving antenna means and tuned to the radio frequency carrier of the broadcast station so as to detect and produce hourly time beep output signals, and to remove amplitude modulation from said carrier and produce an output signal that is an amplitude-limited replica of the broadcast station radio frequency carrier, (C) first frequency synthesizer means connected to output of the amplifier-limiter means to produce a synchronizing clock signal coherent with hourly beep signals at its first output and to phase-lock to the radio frequency carrier of the broadcast station to synthesize therefrom and provide at its second output a second radio carrier of predetermined frequency $f_i$, which frequency $f_i$ may be different for each remote radio receiver and is different from but phase-locked to the radio frequency carrier of the broadcast station, (D) second receiving antenna means for detecting radio signals from the central transmitter station at radio frequency $f_i$, (E) tuned amplifier means having an input connected to the output of the second antenna means to amplify the received carrier $f_i$, (F) synchronous mixer means having a first input connected to the second output of the frequency synthesizer means, and a second input connected to output of tuned amplifier means to thereby produce a demodulated signal at its output, (G) low pass filter means having an input connected to the output of mixer means and providing output signals essentially identical to narrow-band paging or control signals sent by central transmitter, (H) paging or control signal detector means having a first input connected to output of low pass filter means and a second input connected to first output of first frequency synthesizer means for amplifying and synchronously detecting identification codes and signals and displaying, annunciating and outputting said narrow-band paging or control signals to cooperating external apparatus.

2. A narrow-band paging or control radio communication system in accordance with claim 1 wherein said first frequency synthesizer comprises controlled oscillator means tuned to frequency $f_i$ which is phase-locked to carrier frequency of said broadcast station and from which it produces a synchronizing clock signal at a typical rate of 25 pulses per second at a first output, and a radio frequency signal $f_i$ at a second output, and whereby said clock signal is also synchronized to hourly time beep signals transmitted by broadcast station.

3. A narrow-band paging or control radio communication system in accordance with claim 1 wherein said paging and control signal detector means comprises:

(A) an identification code detector means comprising a presettable digital code detector circuit having a first input connected to output of low pass filter means and a second input connected to first output of first frequency synthesizer to thereby synchronously detect specific identification code corresponding to preset code and thereupon generate an audible beep and trigger signal at its output, (B) digital message detector means having a first input connected to output of low pass filter means and second input connected to first output of first frequency synthesizer to thereby synchronously detect and display received messages and to provide output control signals and messages to cooperating external apparatus.

4. A narrow-band paging or control radio communication system in accordance with claim 1 wherein said broadcast station is a commercial AM broadcast station operating on an assigned frequency in the 550–1500 KHz band, which station is modified to incorporate an hourly time signal generator means which periodically generates a unique brief synchronizing time beep signal that is transmitted by said broadcast station for detection by said remote receivers and by the central transmitter station to thereby synchronize their digital data streams.

5. A narrow-band paging or control radio communication system in accordance with claim 1 wherein the means at the central transmitting station comprises:

(A) a third receiving antenna means for receiving signals from the broadcast station, (B) second tuned amplifier-limiter means connected to the third receiving antenna means and tuned to the radio frequency carrier of the broadcast station so as to detect and produce hourly time beep output signals, and to remove amplitude modulation from said carrier and produce an output signal that is an amplitude-limited replica of the broadcast station radio frequency carrier, (C) second frequency synthesizer means connected to output of the second tuned amplifier-limiter means to produce a synchronizing clock signal coherent with hourly beep signals at its first output and to phase-lock to the radio frequency carrier of broadcast station to synthesize therefrom and provide at its second output one frequency $f_i$ from a plurality of frequency choices $f_h, f_j \ldots$, which plurality of frequencies are different from, but phase-locked to the radio frequency carrier of said broadcast station, (D) channel selector means connected to second frequency synthesizer means to provide selection of any one specific frequency $f_i$ at its output, (E) narrow-band paging or control signal source means connected to output of external cooperating apparatus to generate specific identification codes, messages and control signals in synchronism with the clock signal provided by first output of second frequency synthesizer, (F) modulator means having a first input connected to output of channel selector means, and a second input connected to output of narrow-band paging or control signal source means to thereby produce modulated carrier $f_i$ at its output, (G) power amplifier means connected to the output of modulator means and tuned to amplify modulated frequency $f_i$, (H) a transmitter antenna means connected to output of power amplifier means for radiating paging or control signals to said remote radio receivers.

6. A narrow-band paging or control radio communication system in accordance with claim 5 wherein said narrow-band paging and control signal source comprises:

(A) identification code digital generator means having a first input connected to output of external cooperating apparatus for receiving paging request signals and a second input connected to first output of second frequency synthesizer to generate therefrom unique digital codes at its output corresponding to preset identification code of receiver being paged.

(B) digital message generator means having a first input connected to output of cooperating external sender apparatus and a second input connected to first output of second frequency synthesizer to generate therefrom a digital output message stream at precisely defined digital bit time intervals.

7. A bi-directional narrow-band paging or control radio communication system comprising, in combination, a plurality of remote radio transceivers, a central radio transmitter-receiver station to send and receive narrow-band paging or control signals, and an existing local radio broadcast station to provide a radio frequency carrier reference for the remote radio transceivers and the central transmitter-receiver station, the remote radio transceivers each comprising:

(A) first receiving antenna means for detecting the radio frequency carrier of the broadcast station, (B) tuned amplifier-limiter means connected to the output of the first receiving antenna means and tuned to the radio frequency carrier of the broadcast station so as to remove any amplitude modulation thereon and produce an amplitude limited signal replica of the broadcast station radio frequency carrier at its output, (C) frequency synthesizer means connected to an output of the amplifier-limiter means and thereby phase-locked to the radio frequency carrier of the broadcast station to synthesize therefrom a second radio carrier predetermined frequency $f_i$ at its output, which frequency $f_i$ may be different for each remote transceiver and is different from but phase-locked to the radio frequency carrier of the broadcast station, (D) second antenna with duplexer means including a receiving terminal and a transmitting terminal for sending and receiving radio signals at frequency $f_i$, (E) tuned amplifier means having an input connected to the receiving terminal of the second antenna means to amplify the received carrier $f_i$, (F) synchronous mixer means having a first input connected to the output of the frequency synthesizer means, and the second input connected to the output of tuned amplifier means, to thereby produce a demodulated signal at its output, (G) low pass filter means having an input connected to the output of mixer means and providing an output signal to external cooperating apparatus which is essentially identical to narrow-band paging or control signals sent by central transmitter, (H) narrow-band paging or control signal source means connected to output of external cooperating apparatus to generate specific identification codes, messages and control signals for transmission to central receiver-transmitter station, (I) modulator means having a first input connected to output of frequency synthesizer means, and a second input connected to output of narrow-band paging or control signal source means to thereby produce modulated carrier $f_i$ at its output, (J) power amplifier means with input connected to the modulator means and with output connected to transmitting terminal of second antenna means to thereby radiate paging or control signals to central receiver-transmitter station.

8. A bi-directional narrow-band paging or control radio communication system in accordance with claim 7 wherein said central transmitter-receiver station comprises an equipment arrangement identical to the equipment arrangement of said remote transceiver but including additional circuit means for synthesizing and selecting any one transmitter frequency $f_i$ from a plurality of frequency choices $f_h$, $f_j$ ..., and for generating and selecting any one of a plurality of unique identification codes.

9. A bi-directional narrow-band paging or control radio communication system in accordance with claim 7 wherein said remote transceivers further includes means to automatically transmit information from narrow-band paging or control signal source to central receiver-transmitter station upon receipt of a unique digital interrogating code sent by said central station.

10. A radio or digital frequency synthesizer for use in communication and control systems comprising, in combination, an existing radio broadcast station modified to transmit periodic hourly time signals and a plurality of remote radio or digital frequency synthesizer means connected to a corresponding plurality of external communication or control apparatus for synchronizing purposes, said synthesizer comprising:

(A) first receiving antenna means for detecting the radio frequency carrier of the broadcast station, (B) tuned amplifier-limiter means connected to the output of the receiving antenna means and tuned to the radio frequency carrier of the broadcast station so as to detect and produce hourly time beep signals at a first output and to remove amplitude modulation from said carrier and produce an amplitude-limited replica of the broadcast station radio frequency carrier at its second output, (C) frequency divider means connected to second output of limiter-amplifier to thereby divide the frequency of the broadcast station carrier to provide a low frequency output signal on the order of 1 Hz phase-locked to said carrier, (D) time gate generator means connected to output of frequency divider to generate therefrom a time gate whose duration $T_o$ is precisely controlled by frequency of broadcast station carrier, (E) voltage controlled crystal oscillator means having multiple outputs and a control terminal, the first output being connected to one input of a gated amplifier, the second input to the gated amplifier being connected to the output of the time gate generator to thereby enable flow of signal through gated amplifier only during time gate duration $T_o$, and a second oscillator output being connected to external apparatus for radio frequency synchronization purposes, (F) presetable modulo M frequency counter means that is reset to a preselected count prior to each count interval $T_o$ and having one input connected to output of gated amplifier to thereby sum the number of cycles of crystal oscillator signal during time duration $T_o$ but overflowing a fixed number of times M to leave a remainder count K at its output, (G) digital-to-analog converter means connected to output of modulo M counter to latch-in remainder count K at end of time gate $T_o$ and convert K into an analog voltage which is connected to control terminal of voltage controlled crystal oscillator in a closed-loop arrangement whereby oscillator is forced to operate at a precise frequency $f_i$.

11. A radio or digital frequency synthesizer in accrodance with claim 10 further including a carrier drop-out detector means connected to second output of limiter-amplifier to generate a reset gate upon detection of a weak broadcast station carrier signal and thereupon reset frequency divider, time gate generator and modulo M frequency counter to thereby eliminate undesirable frequency perturbations to voltage controlled crystal oscillator means.

12. A radio or digital frequency synthesizer in accordance with claim 10 further including a digital clock generator means having a first input connected to first output of amplifier-limiter means and a second input connected to output of voltage controlled crystal oscillator means to generate therefrom a synchronizing clock signal coherent with hourly time beep signals at its output, which output is connected to external cooperating apparatus for synchronization purposes.

13. A radio or digital frequency synthesizer in accordance with claim 10 further including:
(A) hourly time beep signal detector means having a first input for connecting a time gate window and a second input connected to first output of limiter-amplifier means to thereby detect and present at its output the periodic hourly time beep signals transmitted by broadcast station only if they occur during said gate window,
(B) digital clock generator means having a first input connected to output of hourly time beep signal detector and a second input connected to output of voltage controlled crystal oscillator to generate and provide at its first output a synchronizing clock signal coherent with hourly time beep signals, and provide at its second output a predicted time gate window at the anticipated time of arrival of hourly time beep signals; said predicted time gate window is connected to second input of hourly time signal detector means to thereby minimize possibility of erroneous synchronization.

* * * * *